United States Patent Office 3,442,469
Patented May 6, 1969

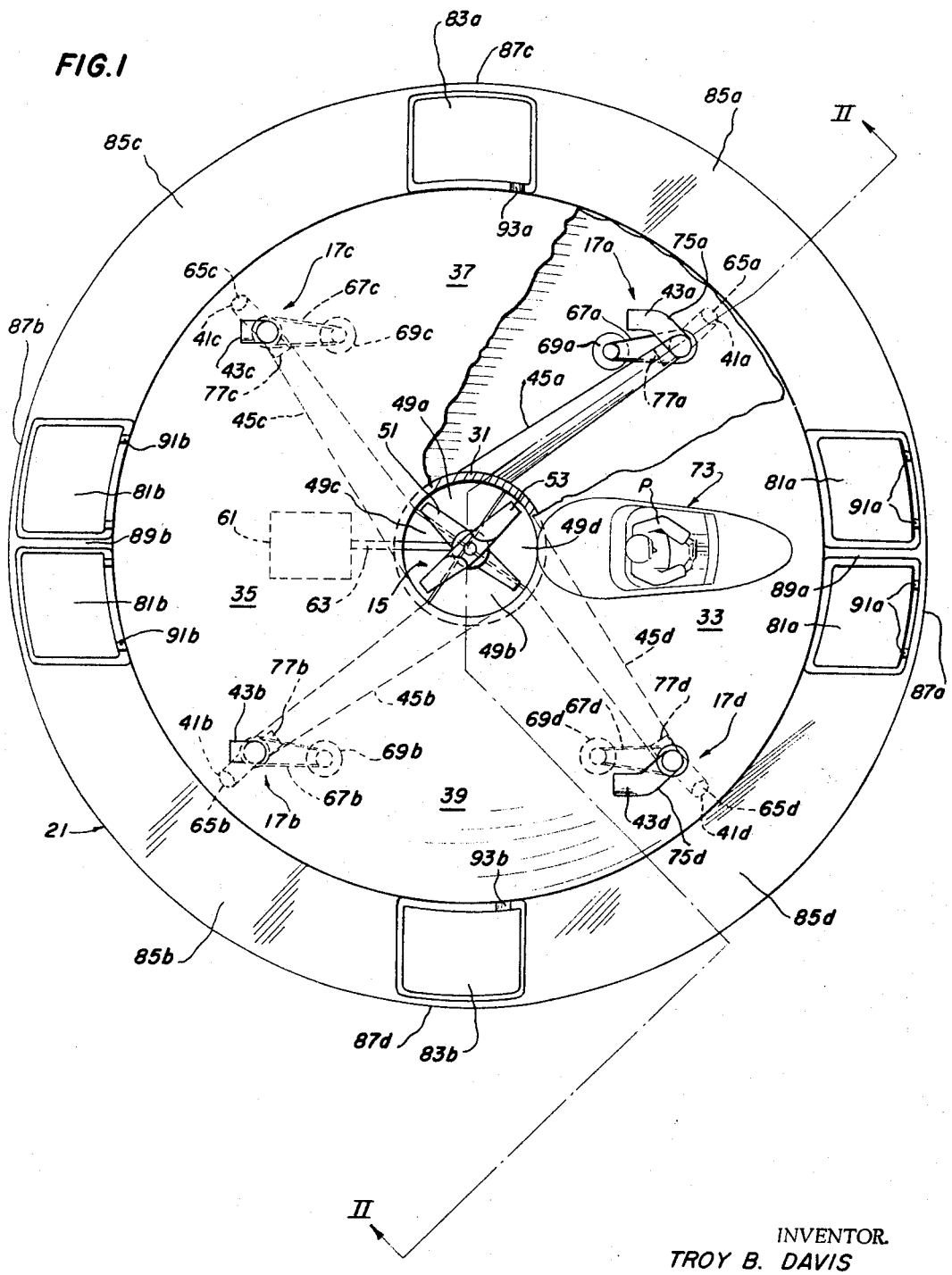

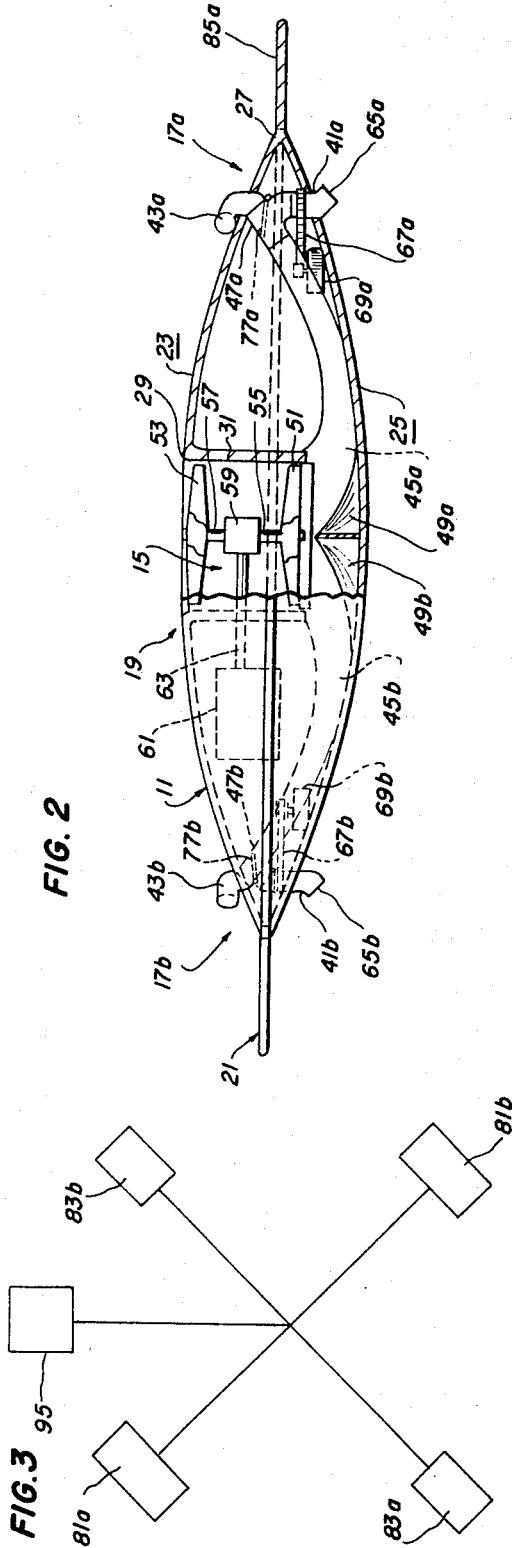
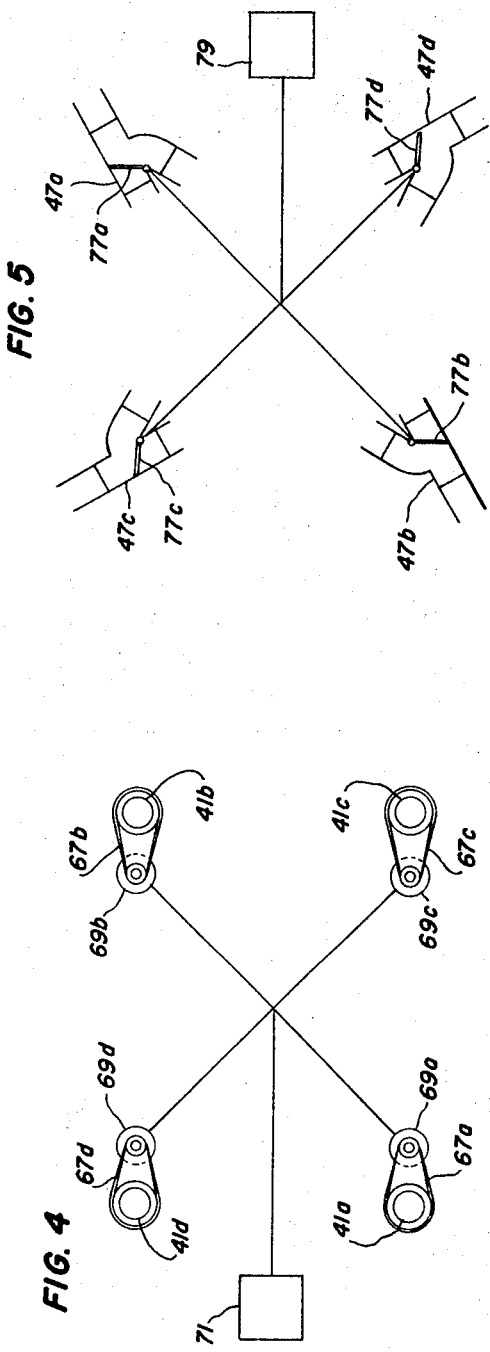

3,442,469
FLYING SAUCER
Troy B. Davis, Memphis, Tenn., assignor of fifty percent to Harold B. Davis, Memphis, Tenn.
Filed Feb. 9, 1968, Ser. No. 704,475
Int. Cl. B64c 29/00
U.S. Cl. 244—23                                 9 Claims

ABSTRACT OF THE DISCLOSURE

A disk-shaped vertical take-off and landing aircraft having a centrally arranged fan chamber, a plurality of radially arranged trunk ducts for conducting pressured air outwardly toward the circular periphery of the aircraft, and includes at the outer end of each trunk duct a pair of vertically spaced thrust nozzles; one nozzle being a lift nozzle for projecting air downwardly, the other nozzle being a forward thrust nozzle for projecting air rearwardly and for propelling the aircraft forwardly in flight. The aircraft includes valve means for directing the air through either the lift thrust nozzles or the forward thrust nozzles or simultaneously through both nozzles. The aircraft also includes thin flat annular plane means arranged about the circular periphery of the body of the craft for stabilizing and controlling the craft in rapid forward flight.

BACKGROUND OF THE INVENTION

Field of the invention

It pertains to heavier-than-air vertical take-off and landing aircraft and particularly pertains to the disk-shaped flying saucer-type craft.

Description of the prior art

A problem of considerable import in the design of VTOL aircraft is designing an aircraft which will perform properly either in slow lifting flight or rapid forward flight. An aircraft having suitable performance capabilities in slow flight may not perform properly in rapid forward flight. There is also the problem of designing a craft which will smoothly make the transition from a lifting slow flight to a rapid forward flight. Many prior art disk-type aircraft utilize the passage of air over stationary lifting air foils for effecting sufficient lift of the aircraft. The circular aircraft in Patents 3,073,551 and 3,276,723 disclose aircraft which are lifted by pressured flows of air being driven over stationary air foils. Many of the circular aircraft and such as disclosed in the above-mentioned patents are not designed for rapid forward flight. A further problem in prior art VTOL design is designing a craft which is stable in high altitude flights. A considerable number of prior art circular aircraft are stable and perform quite properly when they are close to the ground and can utilize the ground effect cushion in stabilizing the craft. However, many prior art crafts do not perform properly or have proper attitude control for operating at high altitude or when the ground effect cushion cannot be utilized.

Summary of the invention

The present invention provides an aircraft suitable for slow lifting flight or for rapid forward flight. The aircraft includes means for effecting a smooth transition between slow lifting flight and rapid flight. The aircraft of the invention includes substantially two separate control systems for controlling respectively the flight of the craft in rapid or slow flight and yet includes means for effecting a smooth transition between the use of the rapid and slow flight control systems.

Brief description of the drawing

FIG. 1 is a top plan view but with a fragmentary portion of the top removed for purposes of clarity.
FIG. 2 is a vertical sectional view of the aircraft taken as on the line II—II of FIG. 1.
FIGS. 3, 4 and 5 schematically illustrate respectively various control means of the aircraft.

Description of the preferred embodiment

The aircraft of the present invention includes basically a circular disk-shaped body 11 having a central upwardly opening core chamber 15; four pairs of thrust nozzles 17a, 17b, 17c, 17d; fan means 19 arranged substantially in core chamber 15 for supplying air through thrust nozzles 17a, 17b, 17c, 17d; and annular plane means 21 arranged about the periphery of body 11.

Body 11 is generally flat oblate ellipsoidal in form and includes upper and lower wall structure 23, 25 each generally convex and circular and joined correspondingly along circular rim portions 27. Upper structure 23 is generally broad and annular in configuration, and the interior portions 29 thereof, in conjunction with vertical cylinder 31 define core chamber 15. Cylinder 31 defining substantially the core structure of core chamber 15 is arranged symmetrically about the vertical center axis of body 11 and provides passageway means for air flowing downwardly through chamber 15 and radially outwardly to nozzles 17a, 17b, 17c, 17d. The nozzles are arranged equiangularly 90° apart and are arranged respectively at the left front, right rear, left rear and right front portions of aircraft body 11. The four pairs of thrust nozzles substantially demarcate the body of the aircraft into forward, rearward, left and right sections 33, 35, 37, 39 respectively.

Pair of thrust nozzles 17a (see FIGS. 1 and 2) are arranged in vertically spaced adjacency and include a lift thrust nozzle 41a arranged in the upper portion of body 11. In much the same arrangement, pairs of nozzles 17b, 17c, 17d include respectively lift thrust nozzles 41b, 41c, 41d and forward thrust nozzles 43b, 43c, 43d.

Individual conduit means supply air to each pair of thrust nozzles and include respectively trunk conduits 45a, 45b, 45c, 45d and conduit Y's 47a, 47b, 47c, 47d. The upstream or intake end of each trunk conduit 45a, 45b, 45c, 45d is faired into the bottom of core chamber 15 and defines substantially four scallop-like quarter sections 49a, 49b, 49c, 49d. The intake end of each trunk conduit 45a, 45b, 45c, 45d is preferably arranged tangential or not on a radian of core chamber 15 to permit lower propeller 51 of fan means 19 to more efficiently force air into each of conduits 45a, 45b, 45c, 45d; the clockwise rotating lower propeller 51 (see FIG. 1) is spaced closely above core chamber bottom sections 45a, 45b, 45c, 45d and compresses the air downwardly and centrifugally tangentially outwardly into each of the trunk conduits.

Fan means 19 includes lower and upper propellers 51, 53 mounted on oppositely projecting output shafts 55, 57 of differential gearbox means 59. An internal-combustion engine 61 mounted in rearward section 35 of body 11 is connected through horizontal input shaft 63 to differential gearbox means 59. Engine 61 is adapted to drive propellers 51, 53 respectively clockwise, counterclockwise and to forcibly move air downwardly through core chamber 15 and radially outwardly through pairs of lift nozzles 17a, 17b, 17c, 17d.

Lift thrust nozzles 41a, 41b, 41c, 41d of each pair of nozzles 17a, 17b, 17c, 17d is turnably mounted on a vertical axis and with respective lift thrust nozzle exhaust openings 65a, 65b, 65c, 65d each being arranged on an axis extending obliquely downwardly relative to the axis of rotation of each lift nozzle. Selectively operable chain and sprocket means preferably drive each of lift thrust nozzles 41a, 41b, 41c, 41d respectively about it vertical axis. Chain means 67a, 67b, 67c, 67d driven respectively by suitable motor means 69a, 69b, 69c, 69d is adapted to selectively bi-directionally turn lift thrust nozzles 41a, 41b, 41c, 41d. Lift nozzle orientation control means 71 (indicated schematically in FIG. 4 and of any suitable type well known to those skilled in the art, as for example, a selsyn system) is operable for selectively controlling the orientation of each lift nozzle of pair of thrust nozzles 17a, 17b, 17c, 17d. A pilot indicated P, positioned in cockpit 73 may selectively control the orientation of each lift thrust nozzle 41a, 41b, 41c, 41d through control means 71. It should be noted that suitable indicator means, not shown, and well known to those skilled in the art is preferably provided in cockpit 73 for indicating to the pilot at all times which direction the thrust nozzles 41a, 41b, 41c, 41d are turned. Forward thrust nozzles 43a, 43b, 43c, 43d are each stationarily arranged and project rearwardly relative to body 11. Forward thrust nozzles 43a, 43d, arranged respectively in the left and right front portions of body 11, preferably are divergingly angled rearwardly as indicated at 75a and 75d. The diverging configuration of forward thrust nozzles 43a and 43d permits the rearward blast of air from forward thrust nozzles 43a and 43d to clear the upper oppositely arranged convex surface portions of body 11. Right rear and left rear forward thrust nozzles 43b and 43c each preferably project upwardly and directly rearwardly with no lateral inclination. Although in the drawings the extensions of nozzles 43a, 43b, 43c, 43d above the surface of upper structure 23 is shown somewhat pronounced for purposes of illustration, it will be understood that in actual practice the nozzles 43a, 43b, 43c, 43d are preferably streamlined to reduce resistance to air and preferably lie closely to the surface of upper structure 23.

Pivoted vanes 77a, 77b, 77c, 77d are fitted respectively in conduit Y's 47a, 47b, 47c, 47d. Each vane 77a, 77b, 77c, 77d is adapted to be moved pivotally between a position occluding the passage of air through lift thrust nozzles 41a, 41b, 41c, 41d and a position occluding the passage of air through forward thrust nozzles 43a, 43b, 43c, 43d. Control means 79 (schematically illustrated in FIG. 5 and of any suitable type well known to those skilled in the art, as for example, a selsyn system) is adapted to be controlled by the pilot of the craft for selectively pivotally actuating each valve 77a, 77b, 77c, 77d. Pivotally actuating a valve 77a, 77b, 77c, 77d downwardly occludes passage of air through a respective lift nozzle and directs the air rearwardly through a respective forward thrust nozzle. Conversely, pivotally raising a respective vane 77a, 77b, 77c, 77d occludes passage of air through a respective forward thrust nozzle and directs the air downwardly through a respective lift thrust nozzle.

Annular plane means 21 preferably extends fully about the circular periphery of body 11 and provides stabilizing means for the body in forward flight. Annular plane means 21 preferably includes forward and rearward elevator planes 81a and 81b; left and right aileron planes 83a and 83b and stationary planes 85a, 85b, 85c (see FIG. 1). Coplanar arranged stationary planes 85a, 85b, 85c, 85d extend radially and adjacent planes are preferably stationarily secured together by arced bar-like structures 87a, 87b, 87c, 87d. Forward and rearward elevator planes 81a and 81b respectively are preferably each in two sections and divided respectively by stationary radially extending rib structures 89a and 89b bridging and extending respectively between stationary bar structure 87a and 87b, and body 11 of the aircraft.

Hinge means 91a pivotally interconnect respectively arced bar 87a with the leading edge of forward elevator planes 81a. Hinge means 91b interconnect the leading edge portions respectively of rearward elevator planes 81b with the rearward peripheral section of body 11. Although forward and rearward elevator planes 81a are each shown in two parts, forward elevator planes 81a, 81a preferably are operably fixed together and are adapted to move simultaneously. By the same token rearward elevator planes 81b, 81b preferably are operably fixed together and adapted to move simultaneously. Left and right aileron planes 83a, 83b are supported adjacent the leading edges thereof on coaxial oppositely projecting shafts 93a, 93b mounted by suitable means respectively in peripheral portions of body sections 37, 39 so that each aileron plane 83a, 83b is adapted to be pivotally moved above and below the respective stationary planes 85a, 85b, 85c, 85d.

Elevator and aileron control means 95 (see FIG. 3) provides means for the aircraft pilot for selectively controlling the elevator and aileron planes. The elevator control means is of any suitable type well known to those skilled in the art, as for example, a selsyn system, and preferably includes means for moving forward and rearward elevator planes 81a, 81b simultaneously either upwardly or downwardly. Control means 95 preferably includes aileron control means for pivotally moving aileron planes 83a, 83b simultaneously oppositely for causing body 11 to tilt laterally in forward flight. It will be understood that if desired suitable landing wheels may be provided on the underside of body 11.

A brief description of the operation of the aircraft follows: With the aircraft resting on the ground on its undersurface and with control means 79 being manipulated by the pilot to move valves 77a, 77b, 77c, 77d, the aircraft may be made to raise substantially vertically in flight by opening the throttle of engine 61 and ejecting air through exhaust openings 65a, 65b, 65c, 65d, which provide conjointly an upwardly and inwardly angled balanced thrust. When the aircraft has gained sufficient height to clear surrounding ground objects, control means 79 is again manipulated to cause valves 77a, 77b, 77c, 77d to be partially closed thereby directing a portion of the pressure air through forward thrust nozzles 43a, 43b, 43c, 43d. The thrust of air from nozzles 43a, 43b, 43c, 43d causes the aircraft to move forwardly, to pass through a transition stage, and to gain sufficient forward movement for control of the aircraft by control means 95 and the elevator and aileron planes of the aircraft.

When in forward flight, the aircraft may be caused to drop in a flat manner by manipulating control means 95 to simultaneously raise forward and rearward elevator planes 81a, 81b. Conversely, to cause the aircraft to rise, elevator control means 95 is manipulated to cause aileron planes 83a, 83b to be pivotally lowered thereby causing air pressure on the undersurfaces of the respective elevator planes and to raise the aircraft. In forward flight the craft may be tilted or banked by manipulating aileron planes 83a, 83b by manipulation of control means 95. When it is desired to lower and land the aircraft, nozzle control means 79 is manipulated to cause the air to be directed downwardly through lift thrust nozzles 41a, 41b, 41c, 41d. To turn the aircraft about its vertical axis, nozzle control means 71 is manipulated to cause lift thrust nozzles 41a, 41b, 41c, 41d to turn in a direction tangential to the circular periphery of the craft; jetted air issuing from exhaust openings 65a, 65b, 65c, 65d acting in the ambient air will turn the craft in a desired direction of rotation about its vertical axis. Closing the throttle of engine 61 and reducing power permits the craft to settle to the ground.

While I have shown and described a preferred embodiment of the invention, it will be understood that various modifications in the disclosed structure may be made without departing from the spirit and scope of the invention.

I claim:

1. A VTOL aircraft comprising a body generally flat, oblate ellipsoidal in form having forward, rearward, left and right body sections and core structure defining a vertically opening core chamber symmetrically arranged about the vertical center axis of said body, four pairs of thrust nozzles, the nozzles of each pair being in vertically spaced adjacency and including in each said pair of thrust nozzles, a lift thrust nozzle arranged in the underportion of said body and having a downwardly projecting exhaust opening, and a forward thrust nozzle arranged in the upper portion of said body and having a rearwardly projecting exhaust opening, said pairs of thrust nozzles being arranged adjacent the circular periphery of said body, arranged generally 90° apart, and including left front, right rear, left rear and right front pairs of thrust nozzles, conduit means for conducting air from the lower interior of said core chamber to each pair of thrust nozzles, power-driven fan means for causing pressured air in the lower interior of said core chamber for moving air through said conduit means and through each pair of thrust nozzles, valve means interposedly fitted in said conduit means adapted for directing air through either or both the lift thrust nozzle and forward thrust nozzle of each pair of nozzles, a pilot's cockpit arranged in the front section of said body, and selectively controllable valve control means operable from said cockpit for controlling the valve means of each pair of nozzles and for selectively causing air to exhaust through either said lift thrust nozzle or forward thrust nozzle or for simultaneously through both said nozzles of each pair of thrust nozzles.

2. An aircraft according to claim 1 wherein said lift thrust nozzle of each pair of thrust nozzles is turnably mounted on a vertical axis and with said downwardly projecting exhaust opening being arranged on an axis extending obliquely downwardly and outwardly relative to the axis of rotation of each lift nozzle, and includes lift thrust nozzle orientation control means operable from said cockpit for selectively controlling the orientation of the lift thrust nozzle of each pair of thrust nozzles of said four pairs of thrust nozzles.

3. An aircraft according to claim 1 wherein said power driven fan means for causing pressured air in the lower interior of said core chamber includes a pair of radially bladed propellers tandemly mounted coaxially on a vertical axis and include a righthand and a lefthand propeller, and means for driving said propellers contradirectionally and respectively in directions for causing said pressured air in the lower portion of said core chamber.

4. An aircraft according to claim 3 wherein said means for driving said propellers includes an internal-combustion engine mounted in said rearward body section and differential type gearbox means arranged substantially between said pair of propellers having a horizontal input shaft connected with the power output of said engine and having a pair of oppositely projecting vertical output shafts connected respectively with said pair of propellers 5. An aircraft according to claim 1 wherein said conduit means for conducting air from the lower interior of said core chamber to each pair of thrust nozzles of said four pairs of nozzles includes respectively four individual conduit means for conducting air from said core chamber in four substantially discrete flows of air; each said individual conduit means being adapted to supply pressured air to a respective pair of thrust nozzles including a trunk conduit and a conduit Y having an inlet and a pair of outlets, said trunk conduit being arranged generally radially in the lower portion of said body and having an inlet communicating with the lower interior of said core chamber and having an outlet connected with the inlet of said conduit Y, said pair of outlets of said conduit Y being connected respectively with the lift thrust nozzle and forward thrust nozzle respectively of each pair of thrust nozzles.

6. An aircraft according to claim 5 wherein said valve means interposedly fitted in said conduit means includes a pivoted vane fitted in the conduit Y of each said individual conduit means and with said vane being adapted to be pivotally moved between a position occluding the passage of air through said lift thrust nozzle and a position occluding the passage of air through said forward thrust nozzle, and further with said valve control means including means for selectively pivotally actuating said valve of each individual conduit means.

7. An aircraft according to claim 1 which includes thin flat horizontal annular plane means secured to and arranged circumferentially about the circular periphery of said body for stabilizing said body in forward flight.

8. An aircraft according to claim 7 wherein said annular plane means includes forward and rearward pivotally mounted elevator planes pivoted normal to the direction of forward flight and radially spaced respectively from said foward rearward sections of said body, and include elevator plane control means for simultaneously moving said forward and rearward elevator planes selectively upwardly or downwardly for raising or lowering said body in forward flight.

9. An aircraft according to claim 8 wherein said annular plane means includes right and left pivotally mounted aileron planes pivoted normal to the direction of forward flight and radially spaced respectively from said left and right sections of said body, and includes aileron plane control means for pivoting said ailerons simultaneously oppositely and for causing said body to tilt laterally in forward flight.

References Cited

UNITED STATES PATENTS 3,123,320   3/1964   Slaughter _____ 244—12

FOREIGN PATENTS 517,359   2/1953   Belgium.

FERGUS S. MIDDLETON, *Primary Examiner.*

THOMAS W. BUCKMAN, *Assistant Examiner.*